(12) United States Patent
Jheng

(10) Patent No.: US 9,189,032 B2
(45) Date of Patent: Nov. 17, 2015

(54) ROTARY MECHANISM AND RELATED ELECTRONIC DEVICE

(71) Applicant: Wistron Corporation, New Taipei (TW)

(72) Inventor: Shan-Wei Jheng, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 217 days.

(21) Appl. No.: 14/043,830

(22) Filed: Oct. 1, 2013

(65) Prior Publication Data

US 2014/0168878 A1  Jun. 19, 2014

(30) Foreign Application Priority Data

Dec. 14, 2012  (TW) .............................. 101147557 A

(51) Int. Cl.
G06F 1/16 (2006.01)

(52) U.S. Cl.
CPC ............ *G06F 1/1681* (2013.01); *G06F 1/1618* (2013.01); *Y10T 16/52* (2015.01)

(58) Field of Classification Search
CPC .................................................... G06F 1/1681
USPC ......................... 361/679.27; 16/356, 357, 361
See application file for complete search history.

(56) References Cited

U.S. PATENT DOCUMENTS

| 4,584,589 | A | * | 4/1986 | Bivins et al. .................. 343/882 |
| 5,479,678 | A | * | 1/1996 | Reed et al. ..................... 16/325 |
| 5,494,447 | A | * | 2/1996 | Zaidan ............................ 439/31 |
| 5,815,886 | A | * | 10/1998 | Nishio et al. ..................... 16/360 |
| 6,292,981 | B1 | * | 9/2001 | Ford et al. ........................ 16/357 |
| 6,401,299 | B1 | * | 6/2002 | Schwarz .......................... 16/335 |
| 7,107,084 | B2 | * | 9/2006 | Duarte et al. ............... 455/575.3 |
| 7,685,680 | B2 | * | 3/2010 | Chien et al. ..................... 16/361 |
| 8,423,099 | B2 | * | 4/2013 | Liang .......................... 455/575.4 |
| 8,619,415 | B1 | * | 12/2013 | Lam et al. ................ 361/679.26 |
| 2001/0052168 | A1 | * | 12/2001 | Haase et al. ..................... 16/361 |
| 2008/0101003 | A1 | * | 5/2008 | Lin ................................. 361/683 |
| 2008/0242380 | A1 | * | 10/2008 | Kajihara et al. ............ 455/575.4 |

(Continued)

FOREIGN PATENT DOCUMENTS

TW         201209299         3/2012

OTHER PUBLICATIONS

Office action mailed on Jul. 31, 2015 for the Taiwan application No. 101147557, filing date: Dec. 14, 2012, p. 1 line 13-14, pp. 2-3 and p. 4 line 1-17.

*Primary Examiner* — Adrian S Wilson
(74) *Attorney, Agent, or Firm* — Winston Hsu; Scott Margo

(57) ABSTRACT

A rotary mechanism includes a base, a supporting component, a bridging component, a guiding component and a shaft. The base includes a guiding structure. The guiding structure includes a first area, a curvature of the first area is increased from a front end to a rear end of the first area. The bridging component includes a pivot hole and a guiding slot. The guiding component passes through the base and is movably disposed inside the guiding structure. Two ends of the guiding component are respectively disposed on the supporting component and the pivot hole, and the supporting component can rotate relative to the bridging component via the guiding component. The shaft passes through the base and is movably disposed inside the guiding slot. The guiding component moves along the guiding structure, and the supporting component can rotate relative to the base via the bridging component and the shaft.

20 Claims, 12 Drawing Sheets

(56) References Cited

U.S. PATENT DOCUMENTS

| | | | |
|---|---|---|---|
| 2010/0269298 A1* | 10/2010 | Chiang | 16/361 |
| 2011/0043975 A1* | 2/2011 | Chen et al. | 361/679.01 |
| 2011/0304983 A1* | 12/2011 | Senatori | 361/679.55 |
| 2013/0141854 A1* | 6/2013 | Behar et al. | 361/679.09 |

* cited by examiner

ROTARY MECHANISM AND RELATED ELECTRONIC DEVICE

BACKGROUND OF THE INVENTION

1. Field of the Invention

The present invention relates to a rotary mechanism and a related electronic device, and more particularly, to a rotary mechanism with simple structure and large rotation range and a related electronic device.

2. Description of the Prior Art

A conventional tablet computer utilizes a touch panel to perform touch control instruction. Since operation of the touch panel does not meet a user's needs, a portable computer device combining a notebook computer host with keyboard and the touch panel arises for solving above drawbacks. Conventionally, a host module cooperatively with a hinge mechanism pivoted to the host module are utilized for supporting the touch panel, and a track is utilized for sliding the touch panel relative to the host module. For convenient operation, the rotatable touch panel is applied to the conventional notebook computer, and the related rotary mechanism includes the shaft-type mechanism and the slide-type mechanism. Structure of the conventional rotary mechanism is complicated, and rotation range of the conventional rotary mechanism is limited. As a result, it reduces convenience in operation.

SUMMARY OF THE INVENTION

The present invention provides a rotary mechanism with simple structure and large rotation range and a related electronic device for solving above drawbacks.

According to the claimed invention, a rotary mechanism includes a base, a supporting component, a bridging component, a guiding component and a shaft. The base includes a guiding structure. The guiding structure includes a first area, and a curvature of the first area is increased from a front end of the first area to a rear end of the first area. A pivot hole and a guiding slot are formed on the supporting component. The guiding component passes through the base and movably disposed inside the guiding structure. Two ends of the guiding component respectively pivot to the supporting component and the pivot hole on the bridging component. The shaft passes through the base and movably disposed inside the guiding slot on the bridging component. The guiding component drives the bridging component to rotate relative to the shaft, and the supporting component rotates relative to the base via the bridging component and the shaft when the guiding component moves along the guiding structure.

According to the claimed invention, a distance between the guiding component and the shaft is varied according to a movement of the guiding component along the guiding structure.

According to the claimed invention, the guiding slot is a linear slot, the shaft moves along the linear slot linearly.

According to the claimed invention, the guiding structure further includes a second area connected to the rear end of the first area.

According to the claimed invention, a curvature of the second area is increased, decreased or constant from a front end of the second area to a rear end of the second area.

According to the claimed invention, the base is disposed on a first casing, and the supporting component is disposed on a second casing. The guiding component is located at the first area of the guiding structure when an included angle between the first casing and the second casing is between a first angle and a second angle. The guiding component is located at the second area of the guiding structure when an included angle between the first casing and the second casing is between the second angle and a third angle.

According to the claimed invention, the base includes a first portion and a second portion. The second portion is flexuously connected to the first portion, and the guiding structure is disposed on the second portion.

According to the claimed invention, a constraining block is disposed on an end of the guiding component connected to the bridging component. The bridging component further includes a constraining slot connected to the pivot hole, and the constraining block is movably disposed inside the constraining slot.

According to the claimed invention, rotation range of the guiding component relative to the pivot hole is within 0 degree to 90 degrees via a combination of the constraining block and the constraining slot.

According to the claimed invention, the rotary mechanism further includes an auxiliary bridging component disposed on the supporting component and the base respectively by the guiding component and the shaft. The bridging component and the auxiliary bridging component are respectively disposed on two opposite surfaces of the base.

According to the claimed invention, the guiding component includes a first part, a second part and a third part arranged in sequence. The first part and the third part are respectively disposed on the supporting component and the bridging component, and the second part is slidably disposed inside the guiding structure. Dimensions of the first part and the third part are different from dimension of the second part. The first part and the third part are respectively connected to two ends of the second part.

According to the claimed invention, the rotary mechanism further includes a fixing component and a torsional component. The fixing component is disposed on the base. Two ends of the torsional component are respectively disposed on the fixing component and the shaft.

According to the claimed invention, widths of two ends of the guiding structure are substantially greater than a width of middle of the guiding structure, and the width of the middle substantially equals radial dimension of the guiding component.

According to the claimed invention, an electronic device includes a first casing, a second casing and a rotary mechanism disposed between the first casing and the second casing. The rotary mechanism includes a base, a supporting component, a bridging component, a guiding component and a shaft. The base is disposed on the first casing. The base includes a guiding structure. The guiding structure includes a first area, and a curvature of the first area is increased from a front end of the first area to a rear end of the first area. The supporting component is disposed on the second casing. A pivot hole and a guiding slot are formed on the supporting component. The guiding component passes through the base and movably disposed inside the guiding structure. Two ends of the guiding component respectively pivot to the supporting component and the pivot hole on the bridging component. The shaft passes through the base and movably disposed inside the guiding slot on the bridging component. The guiding component drives the bridging component to rotate relative to the shaft, and the supporting component rotates relative to the base via the bridging component and the shaft when the guiding component moves along the guiding structure.

The rotary mechanism of the present invention utilizes the single shaft and the cam-shaped guiding structure to achieve an aim of large rotation angle. The rotary mechanism of the present invention can rotate the screen relative to the host over than 180 degrees, so the host faces downwardly to be put on the supporting plane (such as the table), the touch screen can face toward the user, and a gravity center of the screen can be positioned above the host for keeping stability of the electronic device. In addition, the present invention includes the guiding structure with the varied curvature. The rotary mechanism can adjust the distance between the supporting component and the shaft during the rotation of the second casing, so as to effectively prevent the first casing and the second casing from the structural interference at specific angles.

The rotary mechanism of the present invention has advantages of simple structure, easy operation and low manufacturing cost. The electronic device can utilize the rotary mechanism to fold and unfold the casings stably, and the included angle between the casings can be adjusted to the predetermined specific angles, so that the operation modes of the electronic device can be conveniently switched for multifunctional application.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
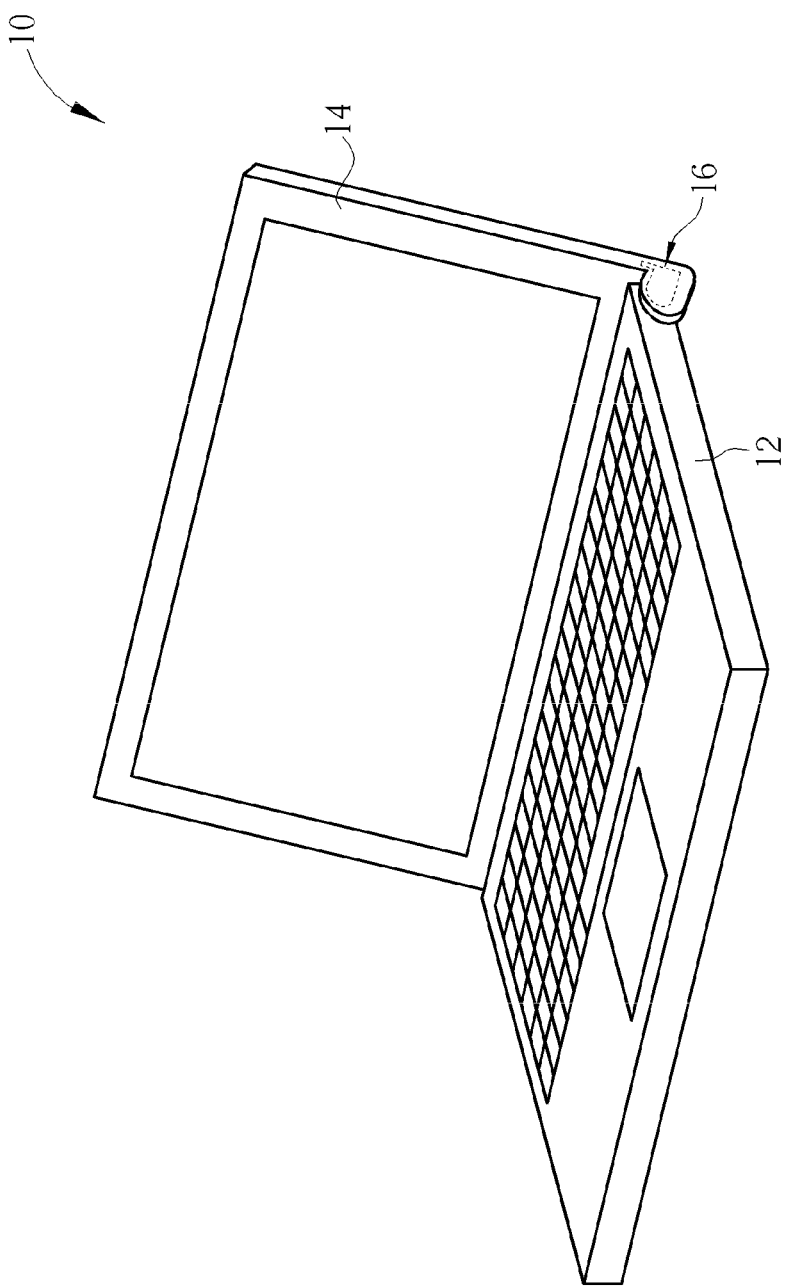
FIG. 1 and FIG. 2 respectively are diagrams of an electronic device in different operation modes according to an embodiment of the present invention.
Figure 2:
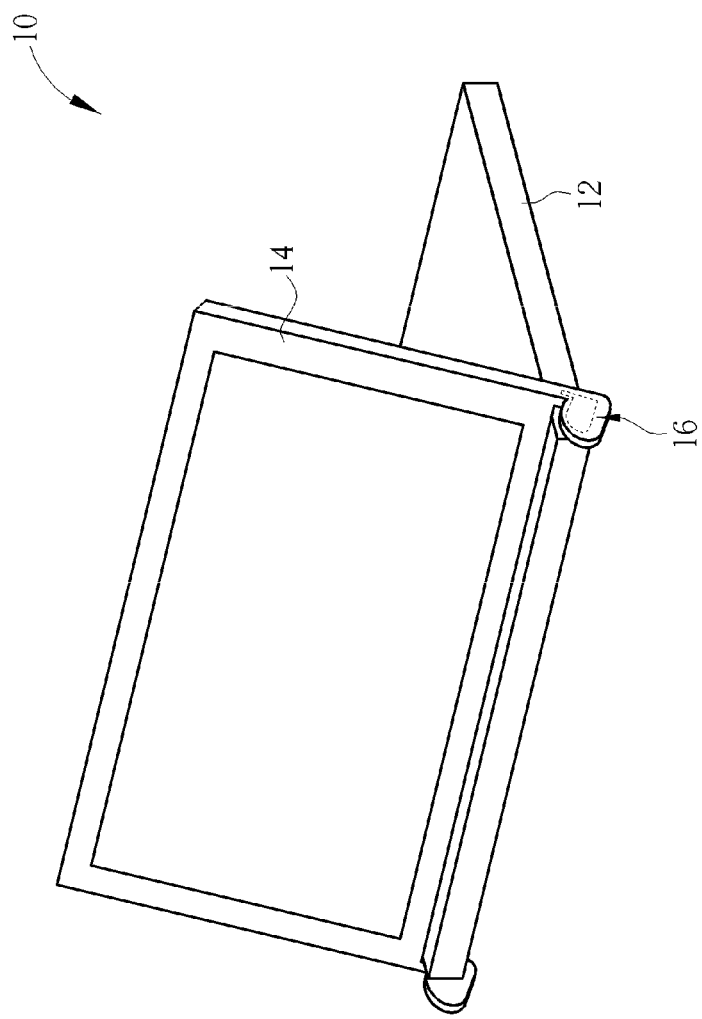

Please refer to FIG. 1 and FIG. 2. FIG. 1 and FIG. 2 respectively are diagrams of an electronic device 10 in different operation modes according to an embodiment of the present invention. The electronic device 10 includes a first casing 12, a second casing 14 and a rotary mechanism 16. The electronic device 10 can be a notebook computer, the first casing 12 can be a host, the second casing 14 can be a screen, and the rotary mechanism 16 is disposed between the first casing 12 and the second casing 14. The second casing 14 can be the touch screen pivoting to the first casing 12 via the rotary mechanism 16.

In the operation mode shown in FIG. 1, an included angle between the first casing 12 and the second casing 14 can be smaller than 180 degrees. In the meantime the keyboard on the host (the first casing 12) faces upward, and the electronic device 10 can be the notebook computer mode. In the other operation mode shown in FIG. 2, the included angle between the first casing 12 and the second casing 14 can be greater than 180 degrees. The keyboard on the host (the first casing 12) faces downward. The electronic device 10 utilizes the first casing 12 to be the holder for holding the second casing 14, so that the touch screen (the second casing 12) can be operated conveniently.

Figure 3:
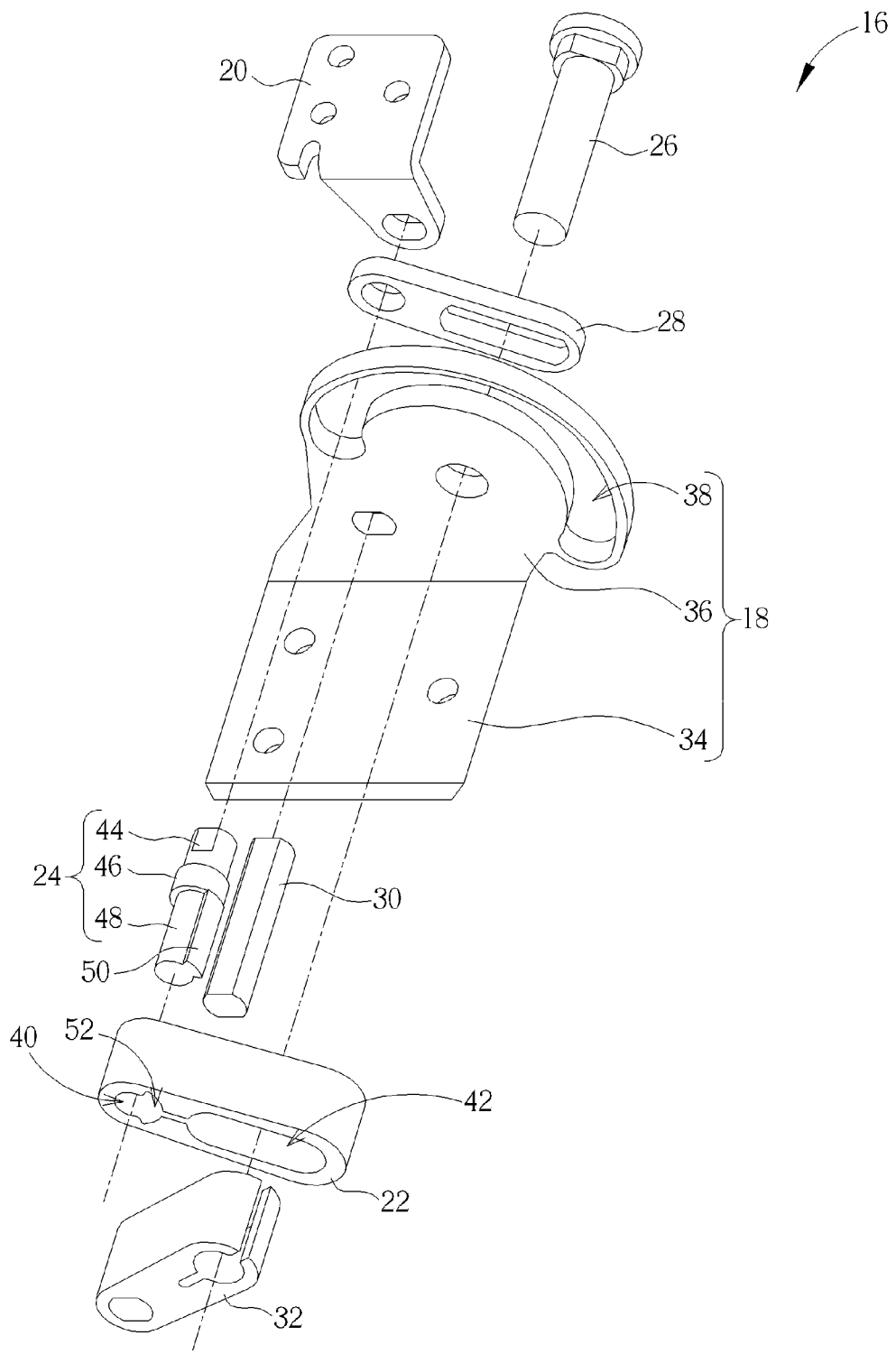
FIG. 3 is an exploded diagram of a rotary mechanism according to the embodiment of the present invention.

Please refer to FIG. 3. FIG. 3 is an exploded diagram of the rotary mechanism 16 according to the embodiment of the present invention. The rotary mechanism 16 includes a base 18, a supporting component 20, a bridging component 22, a guiding component 24, a shaft 26, an auxiliary bridging component 28, a fixing component 30 and at least one torsional component 32. The base 18 and the supporting component 20 are respectively disposed on the first casing 12 and the second casing 14. The base 18 can include a first portion 34, a second portion 36 and a guiding structure 38. The first portion 34 can be fixed on the first casing 12 by screws. The second portion 36 is flexuously connected to the first portion 34, and the guiding structure 38 is disposed on the second portion 36. A pivot hole 40 and a guiding slot 42 are formed on the bridging component 22.

The guiding component 24 passes through the base 18 and is movably disposed inside the guiding structure 38. Two ends of the guiding component 24 are respectively connected to the supporting component 20 and the pivot hole 40, so the supporting component 20 can rotate relative to the bridging component 22 via the guiding component 24. The shaft 26 passes through the base 18 and is movably disposed inside the guiding slot 42. The guiding slot 42 can be a linear slot, and the shaft 26 can linearly move inside the linear slot between two ends of the guiding slot 42. When the guiding component 24 moves along the guiding structure 38, the supporting component 20 can rotate relative to the base 18 via the bridging component 22 and the shaft 26. It is to say, rotation range of the second casing 14 relative to the first casing 12 can be an amount of axial rotation of the supporting component 20 relative to the bridging component 22 and movement of the supporting component 20 relative to the base 18.

As shown in FIG. 3, the auxiliary bridging component 28 has the corresponding pivot hole and the corresponding guiding slot. The auxiliary bridging component 28 is disposed on the supporting component 20 and the base 18 by the guiding component 24 and the shaft 26. The bridging component 22 and the auxiliary bridging component 28 can be respectively disposed on two opposite surfaces of the second portion 36 of the base 18, so as to stably fix the supporting component 20 on the base 20 by clamping force. In addition, the fixing component 30 is disposed on the second portion 36 of the base 18.

Two ends of the torsional component 32 are respectively disposed on the fixing component 30 and the shaft 26. The shaft 26 is clamped by the torsional component 32 and torque is generated when the supporting component 20 rotates relative to the base 18. Quantity of the torque can be substantially proportional to an amount of the torsional component 32. The amount of the torsional component 32 of the present invention is not limited to the above-mentioned embodiment, and depends on actual demand. For example, the amount of the torsional component 32 is more due to large dimension of the second casing 14.

As shown in FIG. 3, the guiding component 24 can include a first part 44, a second part 46 and a third part 48 arranged in sequence. The first part 44 and the third part 48 are respectively connected to two ends of the second part 46. The first part 44 and the third part 48 are respectively disposed on the supporting component 20 and the bridging component 22, and the second part 46 is slidably disposed inside the guiding structure 38. Generally, dimensions of the first part 44 and the third part 48 are different from the dimension of the second part 46. For example, the dimensions of the first part 44 and the third part 48 can be substantially smaller than the dimension of the second part 46, so that the supporting component 20 and the bridging component 22 do not slide to the second part 46 when the supporting component 20 and the bridging component 22 are respectively disposed on the first part 44 and the third part 48.

Therefore, the second part 46 of the guiding component 24 can stably slide along the guiding structure 38 due predetermined structural design of the width of the second part 46 when the guiding component 24 passes through the guiding structure 38, so as to effectively prevent the supporting component 20 (or the bridging component 22) and the second portion 36 of the base 18 from structural interference. Further, widths of two ends of the guiding structure 38 can be greater than a width of middle of the guiding structure 38. Because radial dimension of the guiding component 24 can substantially equal the middle width of the guiding structure 38, the second part 46 of the guiding component 24 can contact inner walls of the guiding structure 38 to generate friction when the guiding component 24 moves to the middle of the guiding structure 38, so as to constrain the rotation angle of the second casing 14 relative to the first casing 12 cooperatively with the torque of the torsional component 32.

Figure 4:
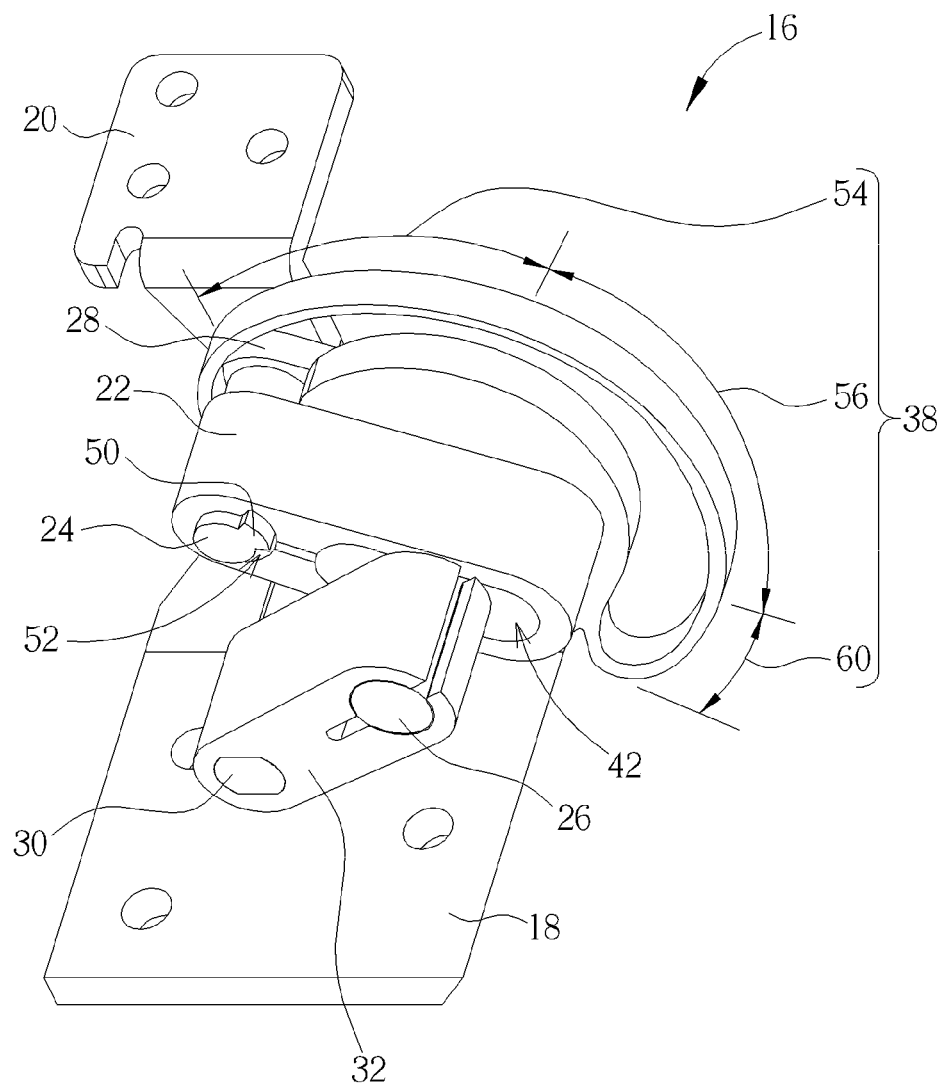
FIG. 4 and FIG. 5 respectively are assembly diagrams of the rotary mechanism in different views according to the embodiment of the present invention.
Figure 5:
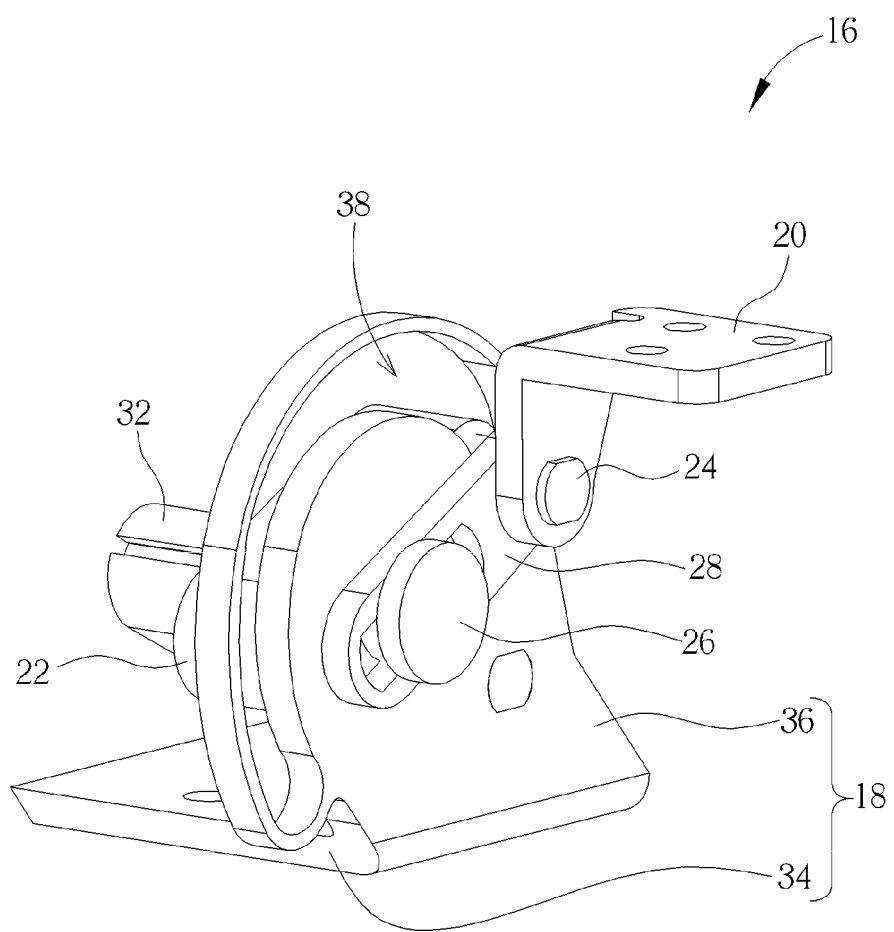

Please refer to FIG. 3 to FIG. 5. FIG. 4 and FIG. 5 respectively are assembly diagrams of the rotary mechanism 16 in different views according to the embodiment of the present invention. The guiding component 24 can include a constraining block 50 disposed on an end of the guiding component 24 disposed on the bridging component 22. The bridging component 22 can further include a constraining slot 52 connected to the pivot hole 40. When the guiding component 24 pivots to the pivot hole 40 on the bridging component 22, the constraining block 50 is slidably disposed inside the constraining slot 52, and the rotation range of the guiding component 24 relative to the pivot hole 40 can equal movement limitation of the constraining block 50 between two ends of the constraining slot 52.

Further, the guiding component 24 can be immovably disposed inside the pivot hole 40, or can be movably disposed inside the pivot hole 40 according to user's demand. The rotation range of the guiding component 24 relative to the pivot hole 40 can be adjusted according to actually operational demand. In the embodiment of the present invention, the rotation range of the guiding component 24 relative to the pivot hole 40 is within 0 degree and 90 degrees, and the preferred rotation range of the guiding component 24 relative to the pivot hole 40 is within 0 degree and 75 degrees.

Figure 6:
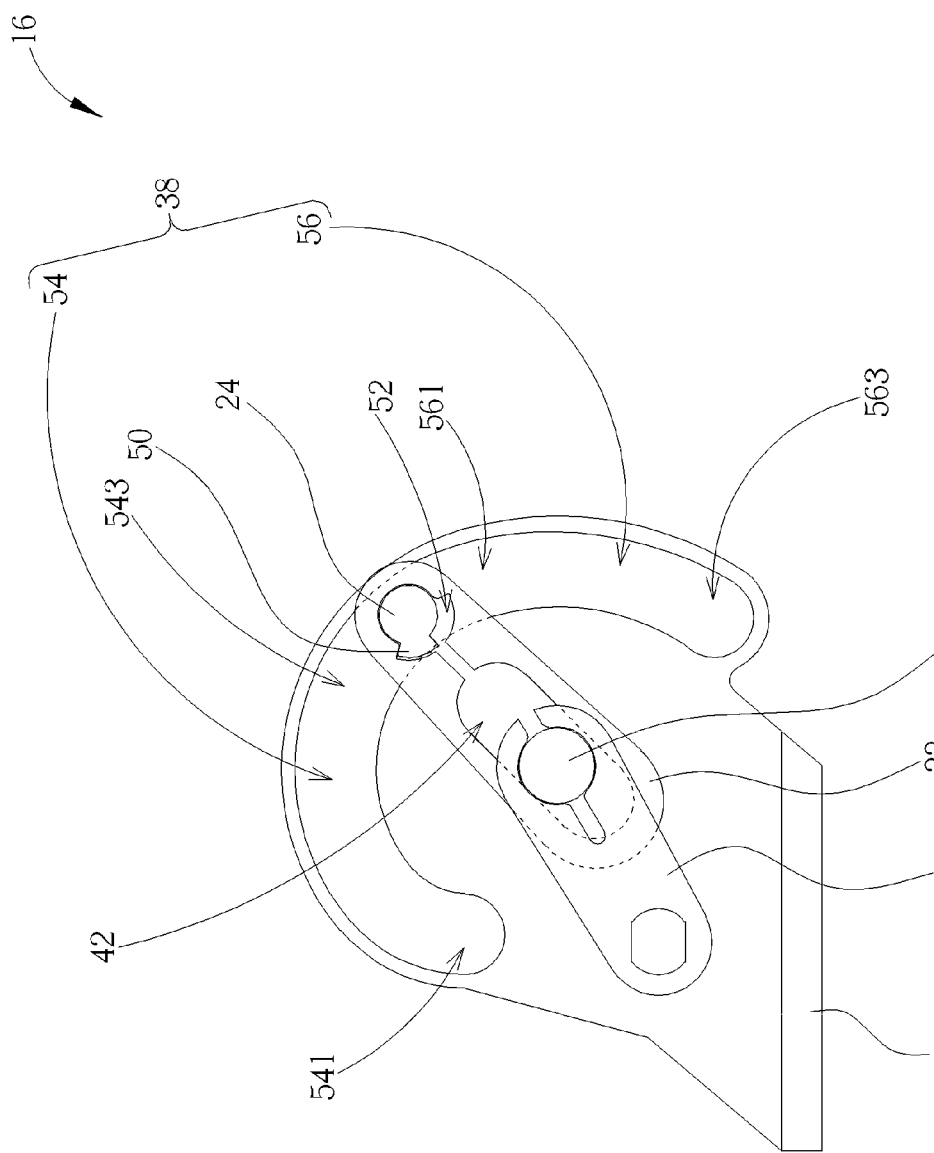
FIG. 6 is a sectional view of the rotary mechanism according to the embodiment of the present invention.

Please refer to FIG. 6. FIG. 6 is a sectional view of the rotary mechanism 16 according to the embodiment of the present invention. The guiding structure 38 can include a first area 54 and a second area 56. A curvature of the first area 54 is increased from a front end 541 to a rear end 543 of the first area 54. A curvature of the second area 56 can be gradually increased, decreased or constant from a front end 561 to a rear end 563 of the second area 56 selectively, which depends to structural design of the first casing 12 and the second casing 14. The front end 561 of the second area 56 is connected to the rear end 543 of the first area 54. Because the bridging component 22 is movably disposed on the shaft 26 via the guiding slot 42, a distance between the guiding component 24 and the shaft 26 can be varied according to a movement of the bridging component 22 relative to the shaft 26 when the guiding component 24 slides along the guiding structure 38.

When the guiding component 24 moves from the front end 541 to the rear end 543 of the first area 54, the guiding component 24 can move the bridging component 22 far from the shaft 26 to increase rotary radius of the supporting component 20 which surrounds the shaft 26. In this embodiment, the curvature of the second area 56 is gradually increased. The bridging component 22 can move far from the shaft 26 according to curvature variation of the second area 56 when the guiding component 24 moves from the front end 561 to the rear end 543 of the second are 56. On the contrary, the relative position between the bridging component 22 and the shaft 26 can be invariable since the curvature of the second area 56 is constant. Position of the bridging component 22 relative to the shaft 26 is set when the guiding component 24 moves over the rear end 543 of the first area 54.

Figure 7:
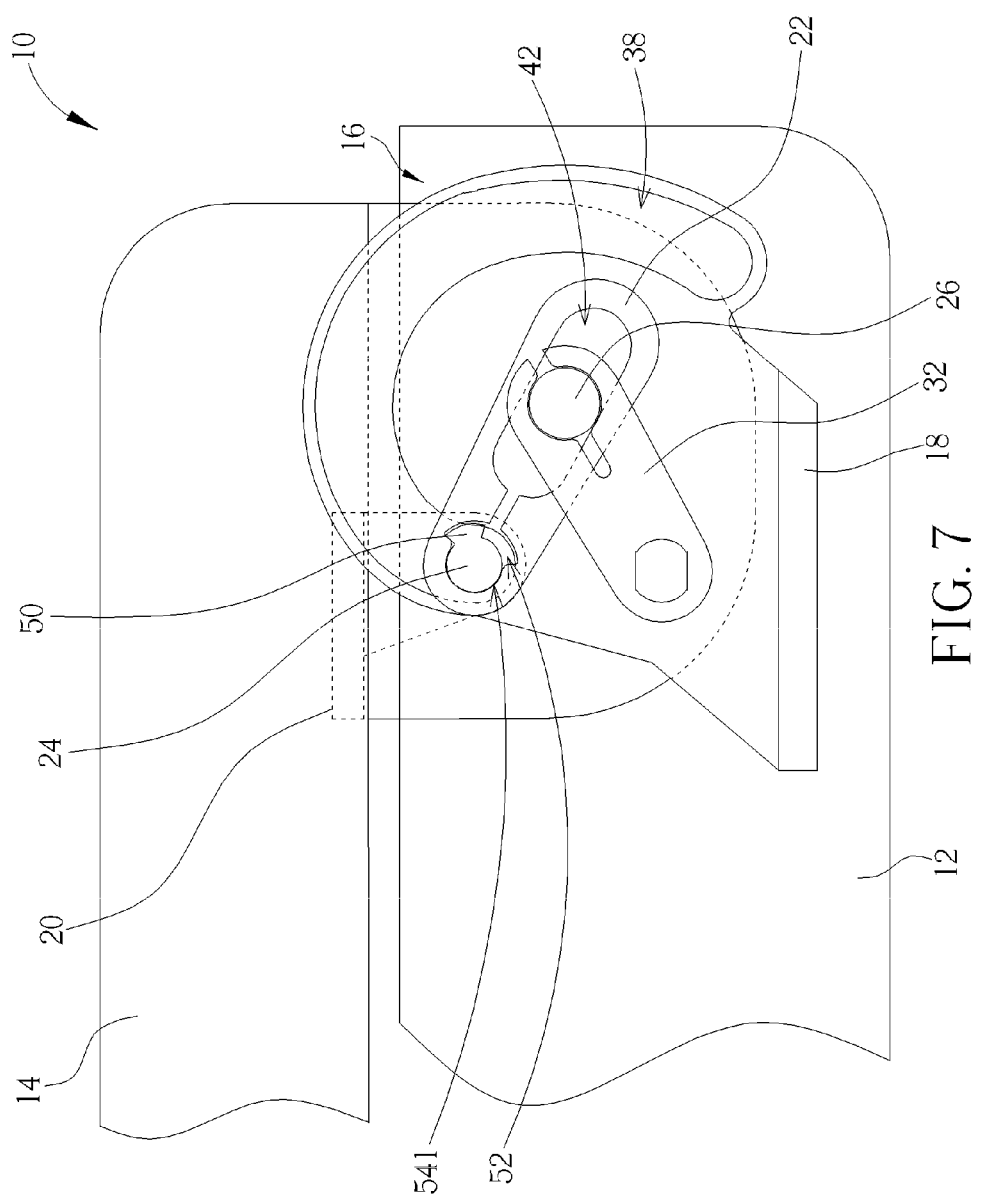
FIG. 7 to FIG. 10 respectively are diagrams of the electronic device in different rotation angles according to the embodiment of the present invention.
Figure 8:
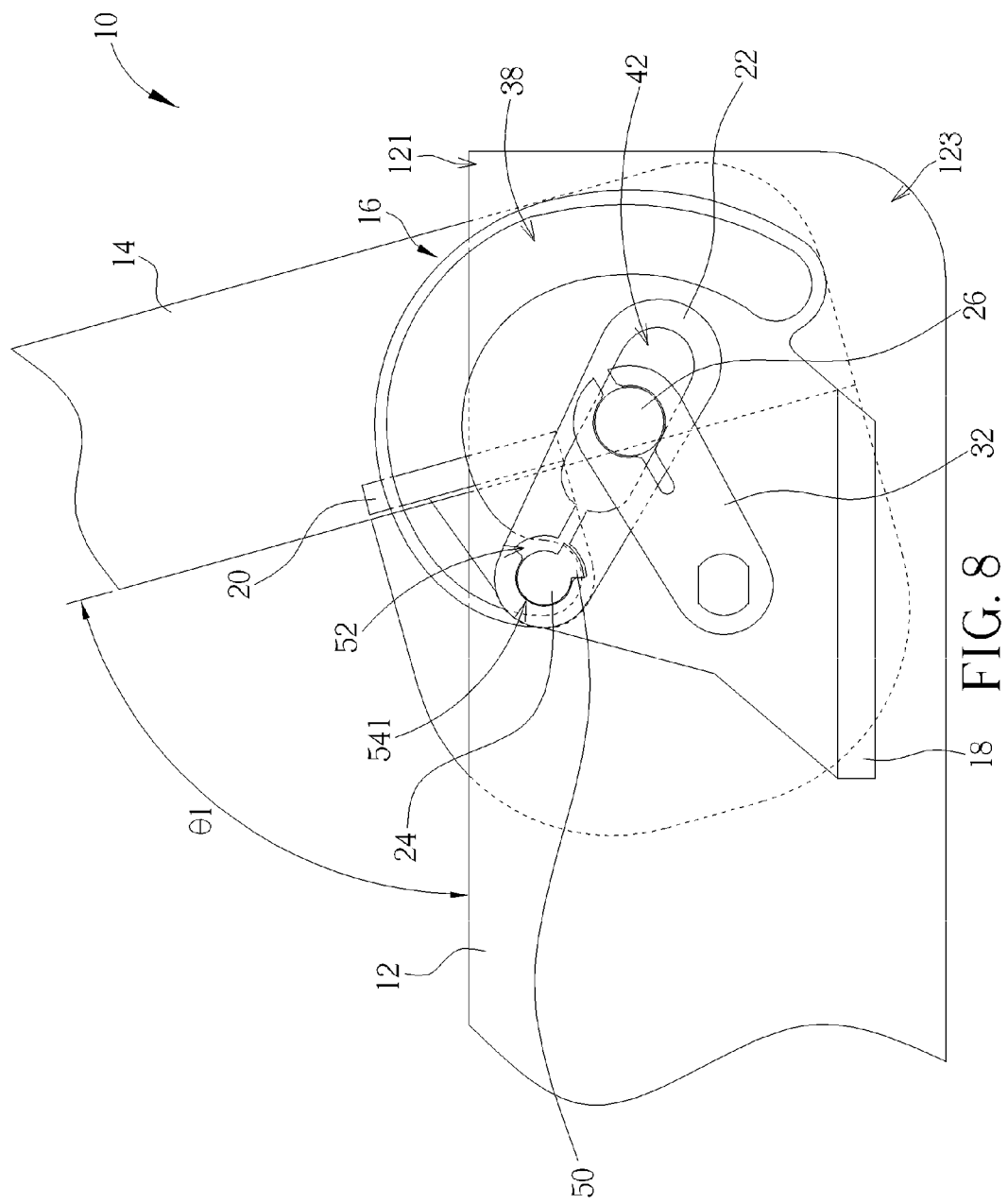

Please refer to FIG. 6 to FIG. 10. FIG. 7 to FIG. 10 respectively are diagrams of the electronic device 10 in different rotation angles according to the embodiment of the present invention. As shown in FIG. 7, the second casing 14 covers the first casing 12. The guiding component 24 is located at the front end 541 of the first area 54 of the guiding structure 38, and the constraining block 50 of the guiding component 24 contacts against an upper end of the constraining slot 52 on the bridging component 22. As shown in FIG. 7 to FIG. 8, the second casing 14 can rotate relative to the first casing 12 at the first angle θ1 (which is 75 degrees in this embodiment). The guiding component 24 revolves on its own axis inside the pivot hole 40 on the bridging component 22, so the constraining block 50 moves from the upper end to a low end of the constraining slot 52, in the meantime the guiding component 24 does not slide along the first area 54. When the second casing 14 rotates to the first angle θ1 (which is 75 degrees in this embodiment), the constraining block 50 of the guiding component 24 can contact against the end of the constraining slot 52 of the bridging component 22 to constrain the rotation of the guiding component 24 relative to the pivot hole 40.

Figure 9:
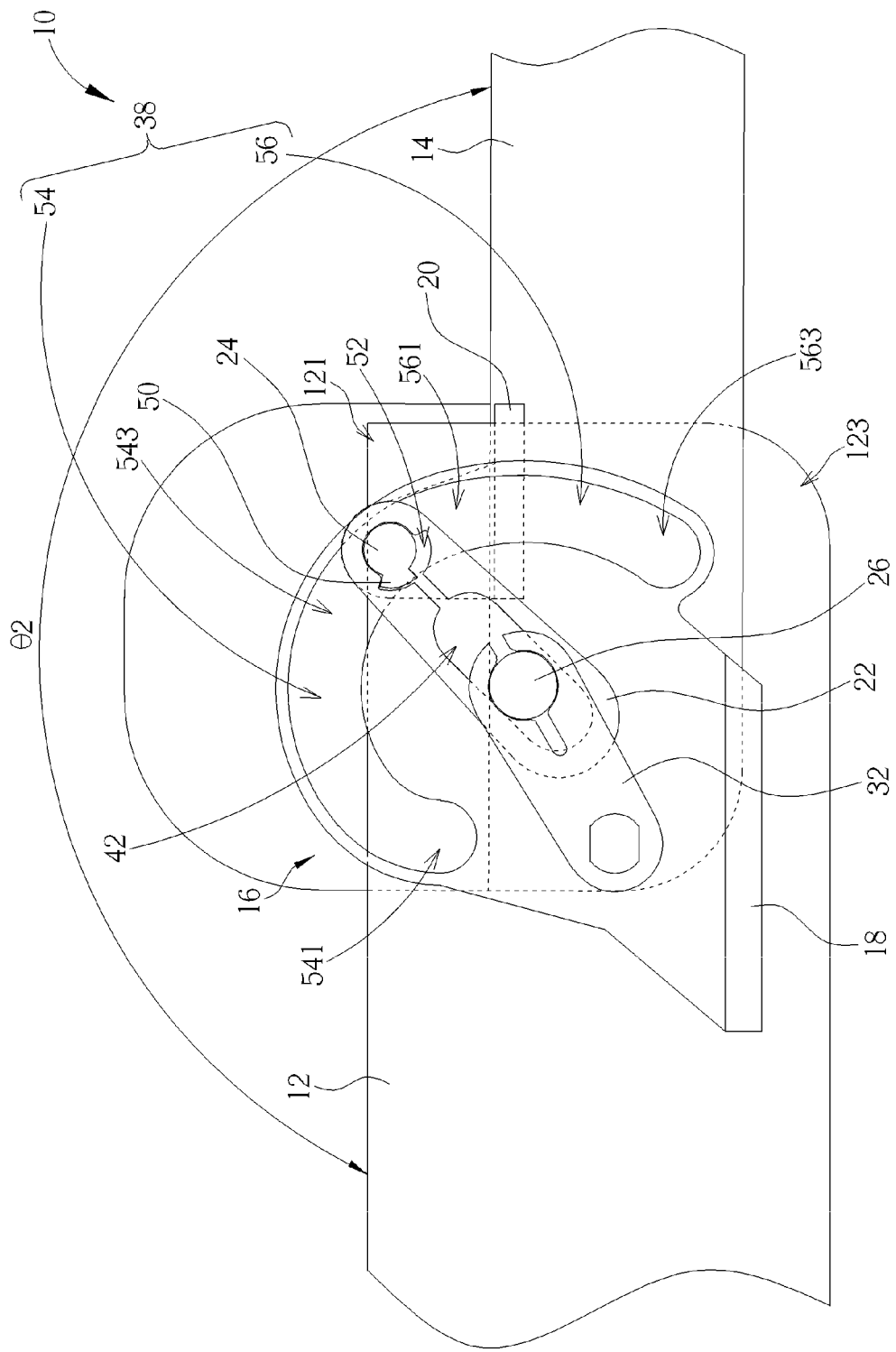

As shown in FIG. 8 to FIG. 9, the second casing 14 can rotate relative to the first casing 12 at the second angle θ2 (which is 180 degrees in this embodiment). The guiding component 24 does not revolves inside the pivot hole 40, and the guiding component 24 can move from the front end 541 to the rear end 543 of the first area 54. Therefore, the guiding component 24 can be located inside the first area 54 when the included angle between the first casing 12 and the second casing 14 is between the first angle θ1 and the second angle θ2. As the guiding component 24 moves along the guiding structure 38, the guiding component 24 can drive the supporting component 20 and the bridging component 22 to simultaneously rotate relative to the shaft 26. According to the curvature variation of the first area 54, the bridging component 22 can move relative to the shaft 26 via the guiding slot 42, and the distance between the guiding component 24 and the shaft 26 can be increased.

Figure 11:
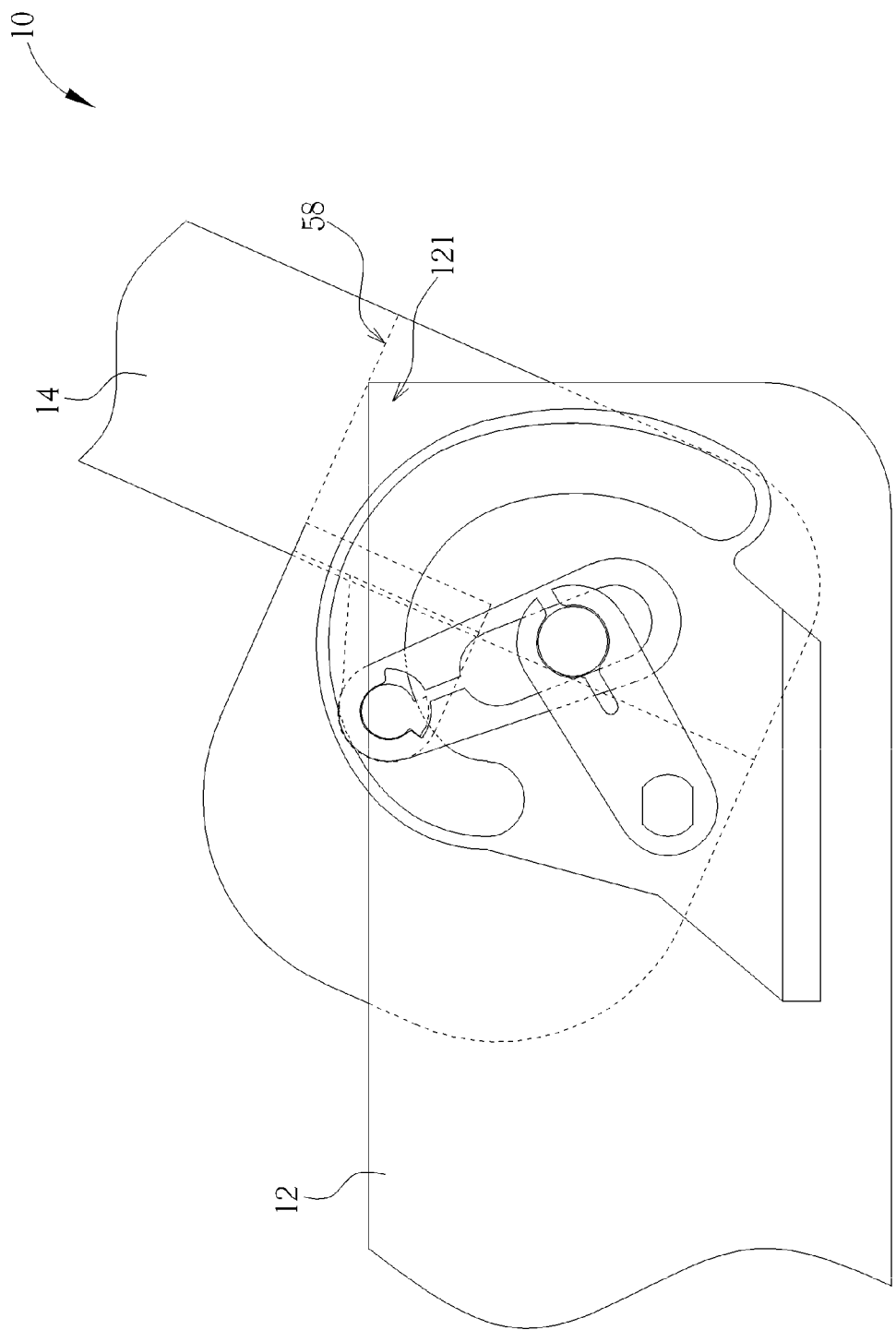
FIG. 11 and FIG. 12 respectively are diagrams of a first casing and a second casing in different rotation angles according to the embodiment of the present invention.
Figure 12:
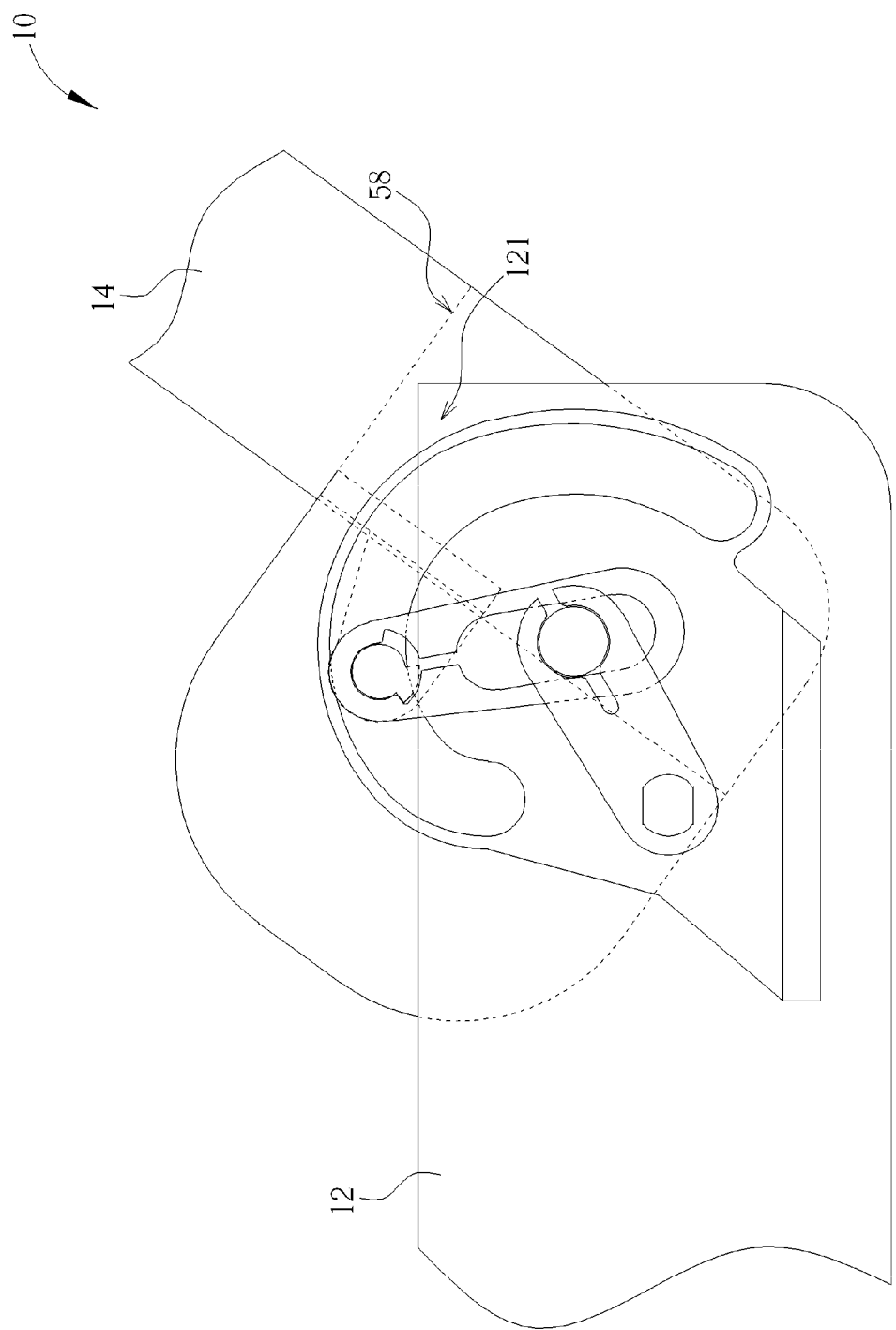

The cam track of the rotary mechanism 16 of the present invention can move the second casing 14 far from the first casing 12 outwardly when the included angle between the first casing 12 and the second casing 14 is adjusted from the first angle θ1 (75 degrees) to the second angle θ2 (180 degrees). Please refer to FIG. 8, FIG. 9, FIG. 11 and FIG. 12. FIG. 11 and FIG. 12 respectively are diagrams of the first casing 12 and the second casing 14 in different rotation angles according to the embodiment of the present invention. As shown in FIG. 11, the bottom 58 of the second casing 12 (the edge adjacent to the first casing 12) is close to (almost contacts) an upper edge 121 of the first casing 121 during the relative rotation.

The present invention designs the guiding structure 38 including the first area 54 with varied curvature, so the bottom 58 can be spaced from the upper edge 121 when the guiding component 24 moves along the first area 54, as shown in FIG. 12. The second casing 14 does not hit the upper edge 121 of the first casing 12 during the continuous rotation, the rotary mechanism 16 can prevent the first casing 12 and the second casing 14 from the structural interference (which may be generated when the bottom 58 contacts the upper edge 121), so that the second casing 14 can rotate to a position that the second casing 14 is parallel to the first casing 12.

Figure 10:
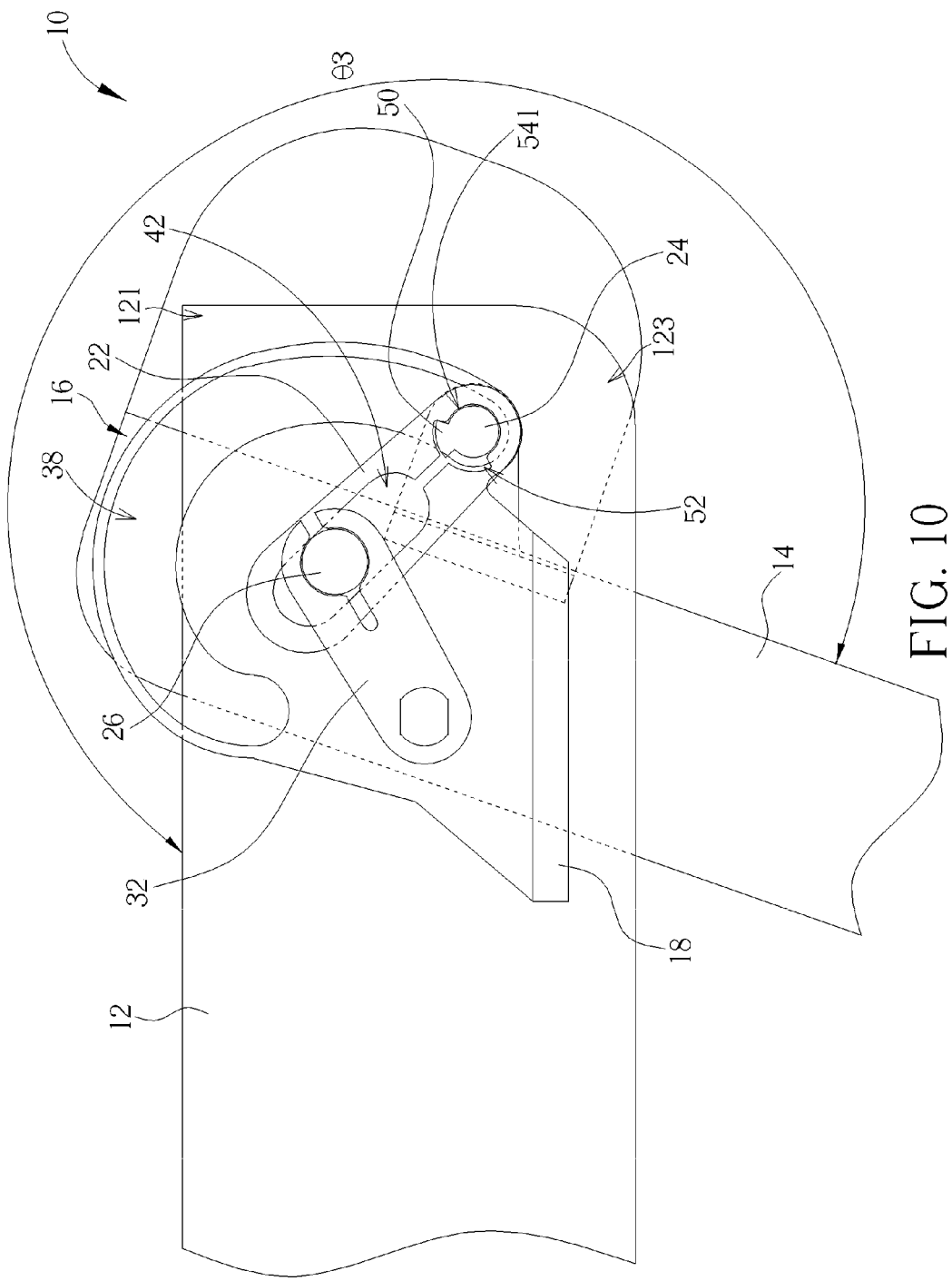

Final, as shown in FIG. 9 to FIG. 10, the second casing 14 can further rotate relative to the first casing 12 at the third angle θ3 (which is 300 degrees in this embodiment), and the first casing 12 can be the holder to hold the second casing 14, such as the operation mode shown in FIG. 2. The guiding component 24 can move from the front end 561 to the rear end 563 of the second area 56, the front end 561 substantially equals the rear end 543 of the first area 54. The guiding component 24 can be located inside the second area 56 when the included angle between the first casing 12 and the second casing 14 is between the second angle θ2 and the third angle θ3.

As the low edge 123 of the first casing 12 is bulged, the curvature of the second area 56 is gradually increased from the front end 561 to the rear end 563. The distance between the guiding component 24 and the shaft 26 is increased according to the movement of the guiding component 24 through the second area 56, which means the supporting component 20 can move far from the shaft 26 during the rotation relative to the base 18. Thus, the second casing 14 does not contact the low edge 123 of the first casing 12 during the rotation, so as to conveniently switch the electronic device 10 to the touch screen mode, such like the operation mode shown in FIG. 1. Method of driving the bottom 58 of the second casing 14 to space from the low edge 123 of the first casing 12 is the same as the method of driving the bottom 58 to space from the upper edge 121, which are illustrated in FIG. 11 and FIG. 12, and the detailed description is omitted herein for simplicity.

Variation of the guiding structure 38 of the present invention is not limited to the above-mentioned embodiment, and depends on design demand. For example, the guiding structure 38 can further include a third area 60 connected to the rear end 563 of the second area 56 for extending length of the guiding structure 38 and magnifying the rotation angle between the first casing 12 and the second casing 12. The included angle between the first casing 12 and the second casing 12 can be greater than 300 degrees. Curvature variation of the guiding structure 38 can be varied according to the actual demand. For example, the curvature of the first area is increased, and the curvature of the second area 56 can be increased, decreased or constant; the curvature of the first area is constant, the curvature of the second area 56 can be increased, decreased or constant; the curvature of the first area is decreased, the curvature of the second area 56 can be increased, decreased or constant.

It should be mentioned that the first angle θ1 can be adjusted according to dimension of the constraining block 50 and length of the constraining slot 52, the second angle θ2 and the third angle θ3 can be adjusted according to lengths and curvatures of the first area 54 and the second area 56. The curvature of the guiding structure 38 corresponds to the distance between the guiding component 24 and the shaft 26, which means the distance variation can conform to the movement of the second casing 14 that is utilized to prevent the structural interference relative to the first casing 12. Values of the first angle θ1, the second angle θ2 and the third angle θ3 are not limited to the above-mentioned embodiment, which illustrates a few of preferred reference angles designed by user's behavior, and depend on design demand.

In conclusion, the rotary mechanism of the present invention utilizes the single shaft and the cam-shaped guiding structure to achieve an aim of large rotation angle. The rotary mechanism of the present invention can rotate the screen relative to the host over than 180 degrees, so the host faces downwardly to be put on the supporting plane (such as the table), the touch screen can face toward the user, and a gravity center of the screen can be positioned above the host for keeping stability of the electronic device. In addition, the present invention includes the guiding structure with the varied curvature. The rotary mechanism can adjust the distance between the supporting component and the shaft during the rotation of the second casing, so as to effectively prevent the first casing and the second casing from the structural interference at specific angles.

Comparing to the prior art, the rotary mechanism of the present invention has advantages of simple structure, easy operation and low manufacturing cost. The electronic device can utilize the rotary mechanism to fold and unfold the casings stably, and the included angle between the casings can be adjusted to the predetermined specific angles, so that the operation modes of the electronic device can be conveniently switched for multifunctional application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rotary mechanism comprising:
    a base, the base comprising a guiding structure, the guiding structure comprising a first area, a curvature of the first area being increased from a front end of the first area to a rear end of the first area;
    a supporting component;
    a bridging component whereon a pivot hole and a guiding slot are formed;
    a guiding component passing through the base and movably disposed inside the guiding structure, two ends of the guiding component respectively pivoting to the supporting component and the pivot hole on the bridging component; and
    a shaft passing through the base and movably disposed inside the guiding slot on the bridging component;
    wherein the guiding component drives the bridging component to rotate relative to the shaft and the supporting component rotates relative to the base via the bridging component and the shaft when the guiding component moves along the guiding structure.

2. The rotary mechanism of claim 1, wherein a distance between the guiding component and the shaft is varied according to a movement of the guiding component along the guiding structure.

3. The rotary mechanism of claim 1, wherein the guiding structure further comprises a second area connected to the rear end of the first area, and a curvature of the second area is increased, decreased or constant from a front end of the second area to a rear end of the second area.

4. The rotary mechanism of claim 3, wherein the base is disposed on a first casing, the supporting component is disposed on a second casing, the guiding component is located at the first area of the guiding structure when an included angle between the first casing and the second casing is between a first angle and a second angle, the guiding component is located at the second area of the guiding structure when an included angle between the first casing and the second casing is between the second angle and a third angle.

5. The rotary mechanism of claim 1, wherein the base comprises a first portion and a second portion, the second portion is flexuously connected to the first portion, and the guiding structure is disposed on the second portion.

6. The rotary mechanism of claim 1, wherein a constraining block is disposed on an end of the guiding component disposed on the bridging component, the bridging component further comprises a constraining slot connected to the pivot hole, the constraining block is movably disposed inside the constraining slot, and rotation range of the guiding component relative to the pivot hole is within 0 degree to 90 degrees via a combination of the constraining block and the constraining slot.

7. The rotary mechanism of claim 1, wherein the rotary mechanism further comprises:
an auxiliary bridging component disposed on the supporting component and the base respectively by the guiding component and the shaft, the bridging component and the auxiliary bridging component being respectively disposed on two opposite surfaces of the base.

8. The rotary mechanism of claim 1, wherein the guiding component comprises a first part, a second part and a third part arranged in sequence, the first part and the third part are respectively disposed on the supporting component and the bridging component, the second part is slidably disposed inside the guiding structure, dimensions of the first part and the third part are different from dimension of the second part, the first part and the third part are respectively connected to two ends of the second part.

9. The rotary mechanism of claim 1, wherein the rotary mechanism further comprises:
a fixing component disposed on the base; and
a torsional component, two ends of the torsional component being respectively disposed on the fixing component and the shaft.

10. The rotary mechanism of claim 1, wherein widths of two ends of the guiding structure are substantially greater than a width of middle of the guiding structure, and the width of the middle substantially equals radial dimension of the guiding component.

11. An electronic device comprising:
a first casing;
a second casing; and
a rotary mechanism disposed between the first casing and the second casing, the rotary mechanism comprising:
a base disposed on the first casing, the base comprising a guiding structure, the guiding structure comprising a first area, a curvature of the first area being increased from a front end of the first area to a rear end of the first area;
a supporting component disposed on the second casing;
a bridging component whereon a pivot hole and a guiding slot are formed;
a guiding component passing through the base and movably disposed inside the guiding structure, two ends of the guiding component respectively pivoting to the supporting component and the pivot hole on the bridging component; and
a shaft passing through the base and movably disposed inside the guiding slot on the bridging component;
wherein the guiding component drives the bridging component to rotate relative to the shaft and the supporting component rotates relative to the base via the bridging component and the shaft when the guiding component moves along the guiding structure.

12. The electronic device of claim 11, wherein a distance between the guiding component and the shaft is varied according to a movement of the guiding component along the guiding structure.

13. The electronic device of claim 11, wherein the guiding structure further comprises a second area connected to the rear end of the first area, and a curvature of the second area is increased, decreased or constant from a front end of the second area to a rear end of the second area.

14. The electronic device of claim 13, wherein the guiding component is located at the first area of the guiding structure when an included angle between the first casing and the second casing is between a first angle and a second angle, the guiding component is located at the second area of the guiding structure when an included angle between the first casing and the second casing is between the second angle and a third angle.

15. The electronic device of claim 11, wherein the base comprises a first portion and a second portion, the first portion is disposed on the first casing, the second portion is flexuously connected to the first portion, and the guiding structure is disposed on the second portion.

16. The electronic device of claim 11, wherein a constraining block is disposed on an end of the guiding component disposed on the bridging component, the bridging component further comprises a constraining slot connected to the pivot hole, the constraining block is movably disposed inside the constraining slot, and rotation range of the guiding component relative to the pivot hole is within 0 degree to 90 degrees via a combination of the constraining block and the constraining slot.

17. The electronic device of claim 11, wherein the rotary mechanism further comprises:
an auxiliary bridging component disposed on the supporting component and the base respectively by the guiding component and the shaft, the bridging component and the auxiliary bridging component being respectively disposed on two opposite surfaces of the base.

18. The electronic device of claim 11, wherein the guiding component comprises a first part, a second part and a third part arranged in sequence, the first part and the third part are respectively disposed on the supporting component and the bridging component, the second part is slidably disposed inside the guiding structure, dimensions of the first part and the third part are different from dimension of the second part, the first part and the third part are respectively connected to two ends of the second part.

19. The arranged of claim 11, wherein the rotary mechanism further comprises:
a fixing component disposed on the base; and
a torsional component, two ends of the torsional component being respectively disposed on the fixing component and the shaft.

20. The arranged of claim 11, wherein widths of two ends of the guiding structure are substantially greater than a width of middle of the guiding structure, and the width of the middle substantially equals radial dimension of the guiding component.

* * * * *